(Model.)
M. ROBINSON.
COMBINED SULKY PLOW AND DRAG.
No. 257,763. Patented May 9, 1882.
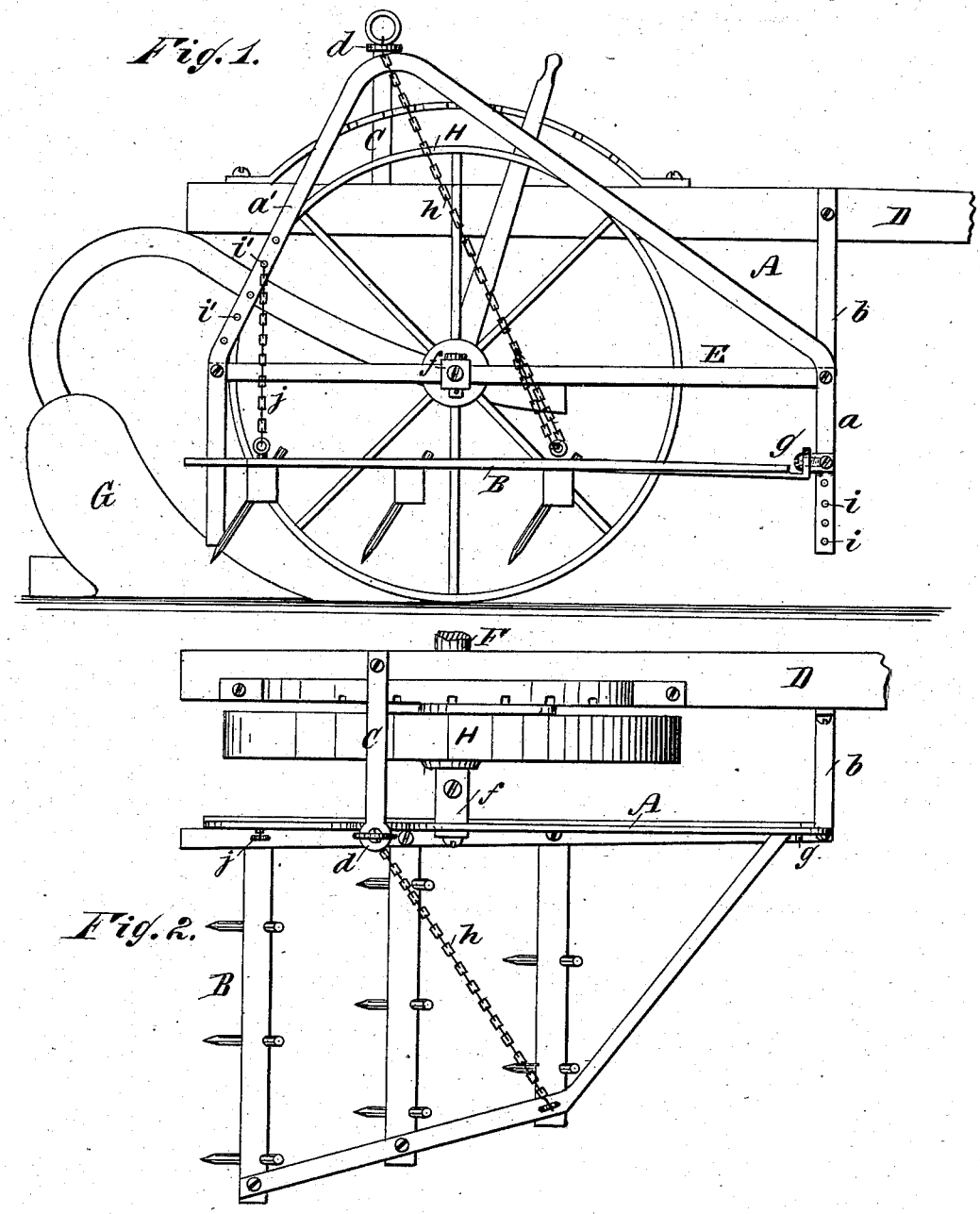
WITNESSES:
Theo. G. Hoster
C. Sedgwick
INVENTOR:
M. Robinson
BY Munn & Co
ATTORNEYS.

UNITED STATES PATENT OFFICE.

MILES ROBINSON, OF WICHITA, KANSAS.

COMBINED SULKY-PLOW AND DRAG.

SPECIFICATION forming part of Letters Patent No. 257,763, dated May 9, 1882.

Application filed November 29, 1881. (Model.)

*To all whom it may concern:*

Be it known that I, MILES ROBINSON, of Wichita, in the county of Sedgwick and State of Kansas, have invented a new and Improved Combined Sulky-Plow and Drag, of which the following is a full, clear, and exact description.

The object of this invention is to provide a drag to be attached to sulky-plows, so that plowing and harrowing may be done at the same time, the drag being adapted to be raised or lowered to suit the depth of furrow turned by the plow, and also to be swung up out of contact with the ground, so as not to cramp or otherwise interfere with turning the plow or with marking out the land.

Reference is to be had to the accompanying drawings, forming part of this specification, in which similar letters of reference indicate corresponding parts in both the figures.

Figure 1 is a side elevation of a sulky-plow having my improved harrow attached, and Fig. 2 is a plan view of the drag and its carrying frame and wheel with the plow removed.

The frame to which the drag B is attached is made of the bent bar A, which is provided at the forward end with the brace $b$, which is adapted to be bolted to the side bar, D, of the frame of the plow. Near the center of the bar A, at its highest point, or where it bends downward, it is provided with the angle-arm C, which reaches over the wheel H of the plow, and is secured upon the top of the said side piece, D. The outer end of this bent arm C is provided with the loop or ring $d$, through which the chain $h$, which is attached to the outer edge of the drag, passes. The bent bar A is braced from end to end by the cross-bar E, which is secured at its ends to the vertical portions of the said bar A. This cross-bar E is provided in its center with the U-plate $f$, which is adapted to be bolted to a suitable projection formed on the end of the axle F of the plow. The drag is hinged at its forward end by the hinge $g$ to the vertical portion $a$ of the frame A, and this hinge is adapted to be placed in any of the holes $i\ i$ for raising and lowering the forward end of the drag. The rear end of the drag is attached to the frame A by means of the chain $j$, which is provided at its upper free end with a hook, which is adapted to be placed in any of the holes $i'\ i'$, made in the inclined part $a'$ of the frame A, for raising or lowering the rear part of the drag.

The harrow or drag may be attached to any ordinary sulky-plow frame, on the outside thereof, which parts it will not be necessary to fully illustrate.

It will be observed that when the drag is set the proper height from the bottom of the plow G, when the plow is not in the ground, the drag will be suspended above the ground; but when the plow enters the ground the drag will rest sufficiently upon the furrows to cause them to be thoroughly harrowed.

In turning the plow at the corners of the land the drag may be swung up to a vertical position by drawing upon the chain $h$. The drag should be held in this position while marking out the land and until one or more furrows shall have been turned, and it may be held in this position, if desired, while moving the machine from field to field. The teeth of the drag are preferably set on an incline, as shown in the drawings.

Having thus fully described my invention, I claim as new and desire to secure by Letters Patent—

1. The frame A, provided with the brace $b$ and the bent arm C, in combination with the hinged drag B, the frame being provided with the cross-bar E, having the attachment $f$, substantially as and for the purposes set forth.

2. The bent frame A, provided with the opposite holes, $i$ and $i'$, in combination with the chain $j$ and drag B, hinged to the part $a$ of the frame at $g$, substantially as described, and for the purpose set forth.

3. The combination, with the frame A, provided with the holes $i\ i'$, brace $b$, cross-bar E, having the attachment $f$, and bent arm C, of the drag B, hinged at $g$ to the frame A, and chains $j\ h$, substantially as described, and for the purpose set forth.

MILES ROBINSON.

Witnesses:
N. F. NIEDERLANDER,
H. R. WATT.